April 16, 1935.                D. E. BROWN                1,998,269
                            CASKET TRUCK DRAPE
                        Filed May 15, 1933            3 Sheets-Sheet 1
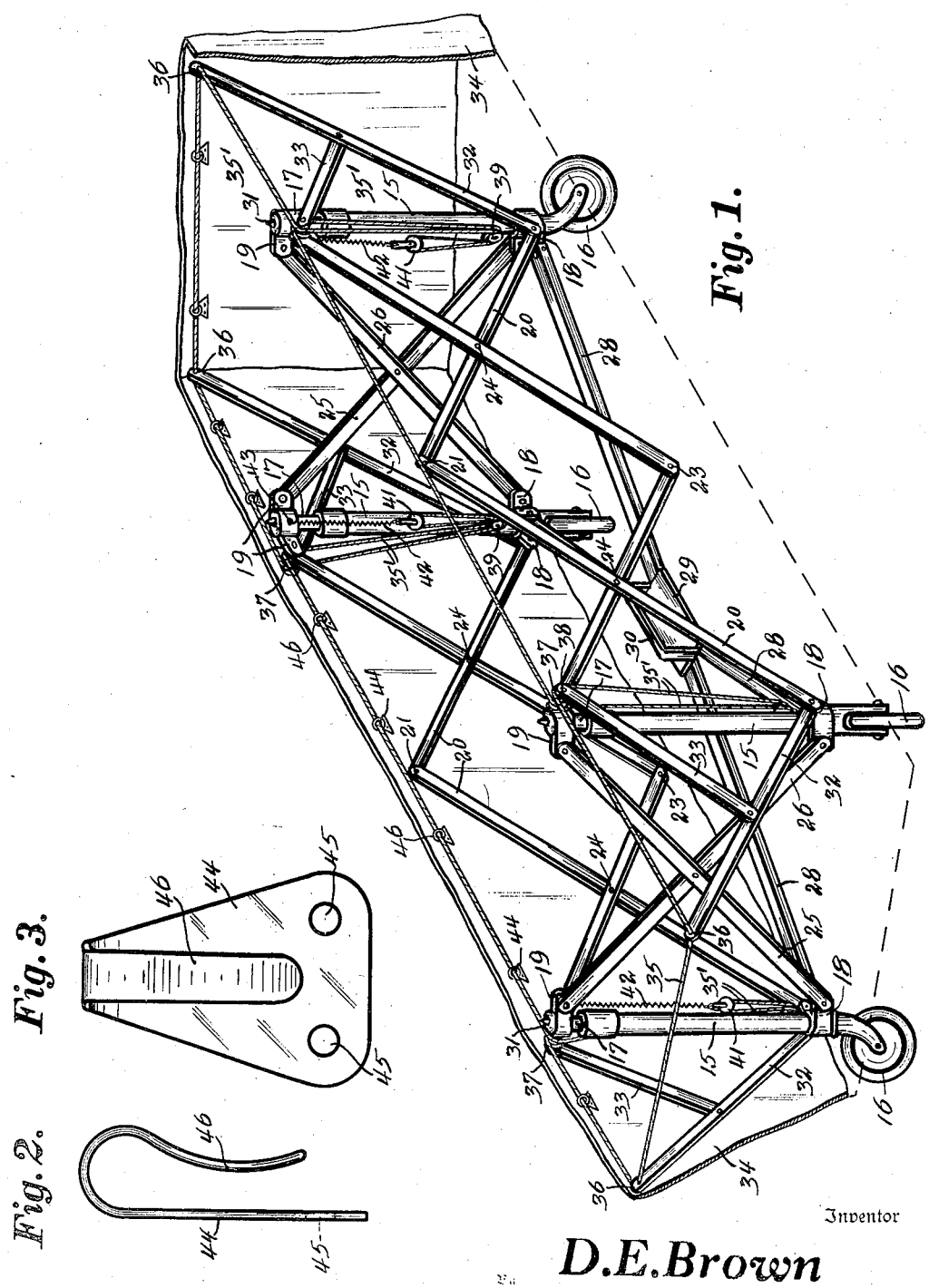
Inventor
D. E. Brown
Arthur H. Sturges
                Attorney

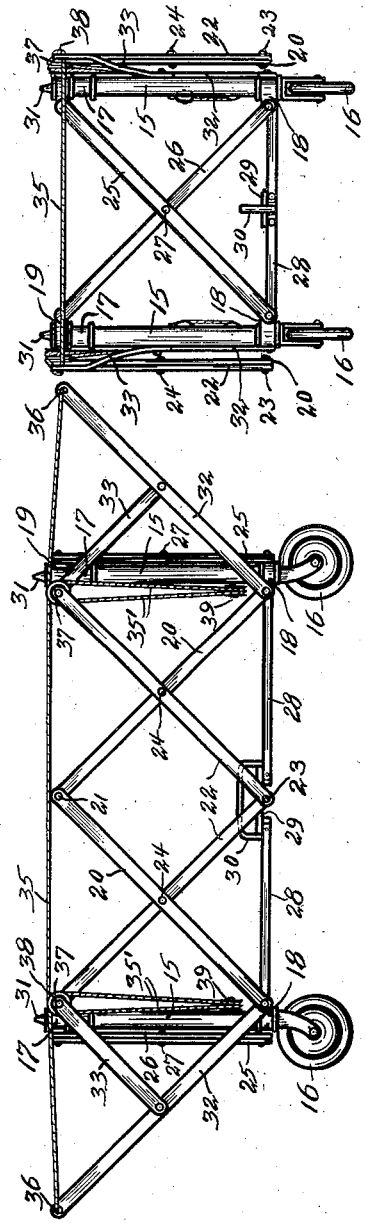
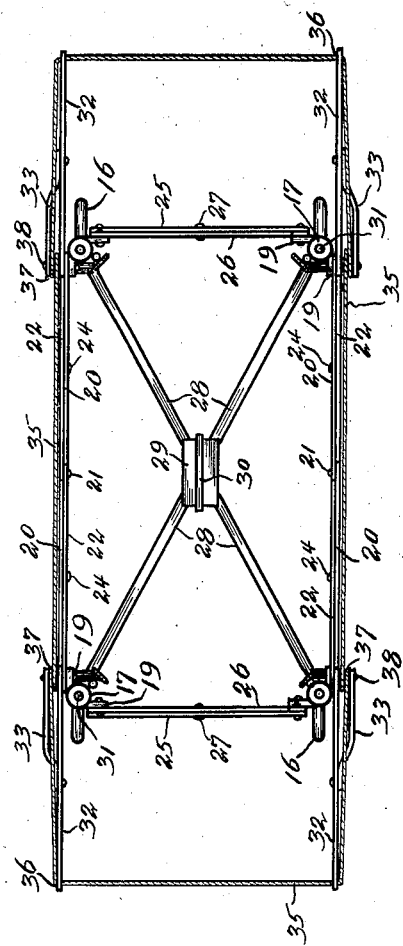

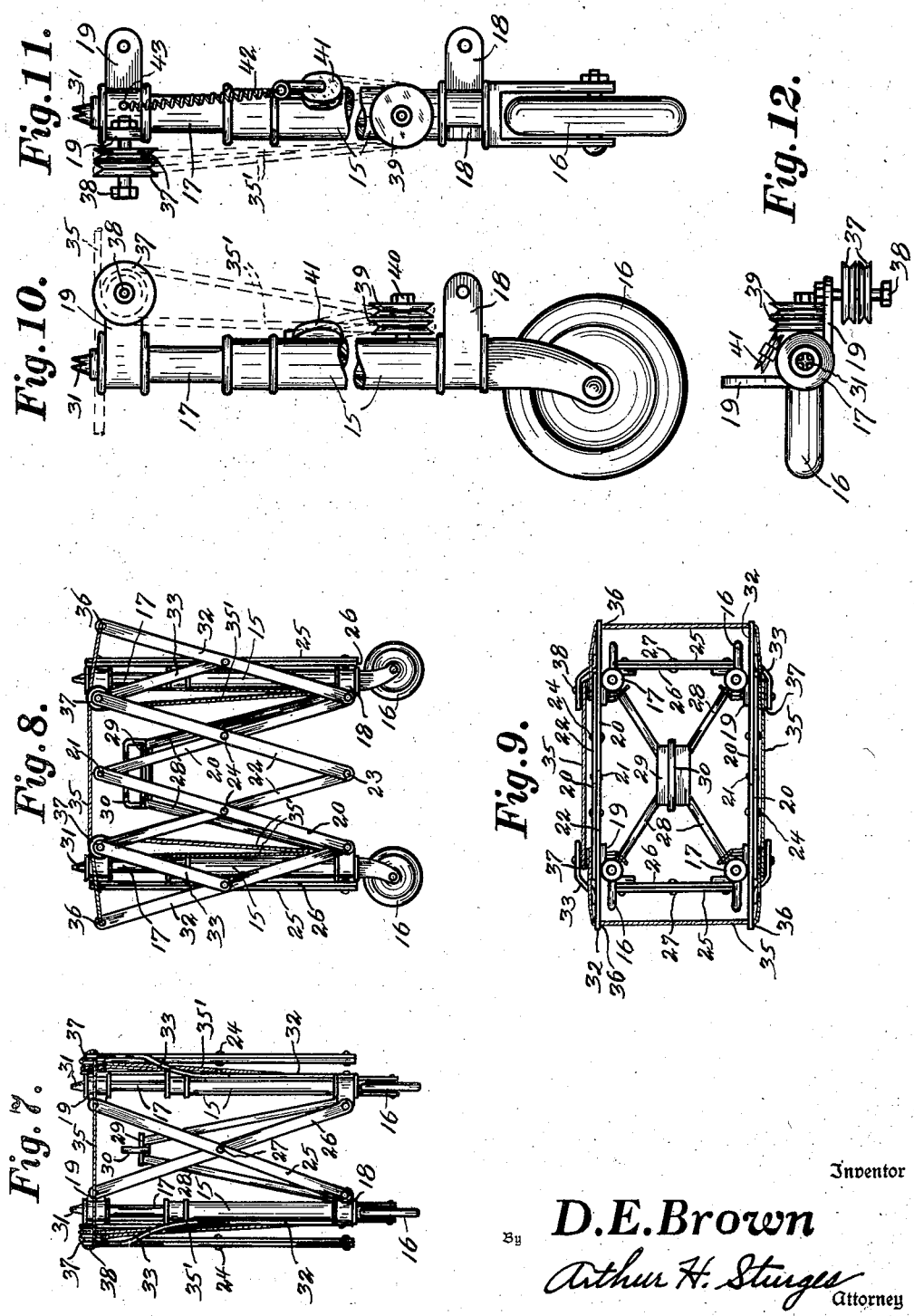

Patented Apr. 16, 1935

1,998,269

UNITED STATES PATENT OFFICE 1,998,269

CASKET TRUCK DRAPE

Derrell E. Brown, Onawa, Iowa

Application May 15, 1933, Serial No. 671,276

5 Claims. (Cl. 27—27)

The present invention relates to funeral equipment, and more particularly to certain improvements in the construction of casket trucks and drapes adapted to be applied thereto.

An object of the present invention is to provide an improved drape support for casket trucks, wherein the drape may be suspended from the upper marginal edge portion of the truck and will follow the adjustment of the truck into long and short positions to accommodate caskets of different lengths, and wherein the drape itself is detachably connected to the truck to admit of this adjustment therewith and at the same time to admit of quick interchange of drapes of different colors and materials in accordance with convention or custom.

A further object of the present invention is to provide an improved drape support so disposed upon a collapsible casket truck that the drape may remain in proper position and be folded with the truck when collapsed, so that the truck and the drape as a unit may be handled and quickly set up or collapsed when the truck is transported and set up at different places for use.

The invention aims at the provision of a drape support incorporated in a truck structure such that the truck with the drape thereon may be readily collapsed into small space and transported in an ordinary passenger automobile or the like, and may be quickly removed therefrom and set up for use at homes, churches and the like incident to the conduct of a funeral.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a casket truck set up and with a drape applied thereto, the near side of the drape being broken away.

Figure 2 is a detail edge view of one of the drape clips employed for suspending the drape on the truck.

Figure 3 is a side elevation of the same.

Figure 4 is a reduced side elevation of the truck with the drape removed.

Figure 5 is an end view of the same.

Figure 6 is a top plan view thereof.

Figure 7 is an end elevation of the truck in collapsed position.

Figure 8 is a side elevation of the same.

Figure 9 is a top plan view thereof.

Figure 10 is a detail enlarged side elevation of one of the corner posts of the truck showing the cable supporting means for controlling the extension and contraction of the drape.

Figure 11 is a similar view taken axially at right angles to Figure 10, and showing the take-up means for the drape supporting cable, and Figure 12 is a top plan view of the same.

Referring now to the drawings, the general structure of the truck is conventional with slight modifications to accommodate the drape support of this invention. The truck is provided with four corner legs 15 which comprise the lower portions of posts and are of tubular construction. The legs 15 are supported upon casters 16 of conventional type, and in each lower post or leg section is slidably mounted an upper post section 17 frictionally held in the tubular section and adapted to offer sufficient resistance for supporting the post section 17 in elevated position when the device is more or less collapsed.

As shown to advantage in Figures 10, 11 and 12, each corner leg or post is provided at the lower end of its lower section 15 with a pair of lugs 18 which extend outwardly from the post at right angles to each other, and the upper slidable post section 17 is in a like manner provided with a pair of lugs 19 disposed at right angles to each other and in register, vertically, with the lower lugs 18.

The corner legs of the truck are connected together along the sides of the truck by means of lazy tongs which in the present instance comprise bars 20 pivotally connected at their lower ends each upon one of the lugs 18 at the bottom of the post and which are pivotally connected together at their other ends on a pivot 21 to support the bars 20 in relatively angular relation. The lazy tongs each have a second pair of bars 22 pivotally connected each at one end to one of the upper lugs 19 of the posts and the lower opposite ends of the bars 22 are pivotally mounted upon a pivot 23 which interconnects the bars. The bars 22 are disposed across the intermediate portions of the bars 20 and are pivotally connected at such points thereto by rivets 24. Thus, the legs or posts of the truck are maintained in upright parallel relation at all times during longitudinal adjustment of the truck to move the posts toward and from each other.

The opposite ends of the truck, as shown in Figure 5, are provided each by a pair of crossed bars 25 and 26 pivotally connected together at their crossed intermediate portions on a rivet 27 and the bars 25 and 26 are pivotally connected at their opposite ends to the lower lugs 18 and the opposite upper lugs 19 of the corner posts. As the upper sections 17 of the posts have sliding movement in the lower sections 15 of the posts, the lazy tongs at the sides of the truck and the crossed bars at the ends of the truck are permitted to collapse or fold together uniformly and equally during the contraction of the truck simultaneously as to its length and width.

The truck is braced by a bottom collapsible bracing structure which also serves as a means for forcing the posts apart or together during the expansion and collapsing of the truck. The brace comprises an arm 28 pivoted at its outer end to each corner post near the bottom thereof and at its inner side, the arms 28 extending diagonally inward and converging to a connecting plate 29 to which the arms 28 are pivotally connected. The plate 29 is provided with an upstanding handle 30 adapted to be grasped by introducing the hand downwardly into the top of the truck. By lifting the handle 30 the arms 28 are swung upwardly and drawn together at their lower ends, as shown in Figures 7, 8 and 9, so as to uniformly and equally draw the corner posts inwardly into contracting position.

Thus, the handle 30 may be drawn upwardly for collapsing the truck and may be forced downwardly for expanding the truck. The frictional engagement of the movable parts of the truck is such as to yieldingly hold the truck in any of its adjusted positions, although any other suitable means may be employed for locking the parts when the correct adjustment is arrived at. Anchoring projections 31 project upwardly from the corner posts for receiving the bottom of the casket thereon to anchor the casket on the truck and prevent accidental shifting or displacement therefrom.

The means for supporting the drape about the truck comprises a foldable extension at each end of the truck in the form of a pair of arms 32 pivotally connected at their lower ends upon the lateral lugs 18 of the adjacent corner posts, the arms 32 extending upwardly and being supported by half length braces 33 which are pivotally connected to the arms 32 at one end at a point intermediate the ends of the arms. The braces 33 are pivotally connected at their opposite upper ends upon the upper lateral lugs 19 of the post. As the post is extended upwardly upon collapsing, the braces 33 swing the arms 32 upwardly into collapsed position. This structure prevails at each end of the truck so that these drape extension supports automatically project or contract during the adjustment of the truck.

As shown to advantage in Figure 1, a drape 34 of any suitable material and color is provided and is adapted to be extended about the ends and along the sides of the truck for completely enclosing the same so that the mechanical features of the truck will not be visible. In order to support this drape 34 in proper position so that it will follow the contraction and expansion of the truck and thus offset the time consuming and undesirable feature of having to remove the drape 34 each time the truck is adjusted or handled, the present invention provides a support for this drape which is so incorporated in the truck structure that it will hold the drape in proper position and contract or fold the drape proportionately to the adjustment of the truck. To accomplish this purpose, the present invention provides a cable or other flexible element 35 which extends entirely about the upper marginal portion of the truck and is threaded through eyes 36 provided in the outer ends of the extension arms 32 so as to hold the cable 35 across the ends of the truck. At each post or leg of the truck the cable 35 is looped downwardly in opposite direction over a pair of pulleys 37 which are mounted upon an elongated pivot 38 which is carried upon the adjacent upper lug 19, the pivot 38 also serving as a pivotal connection for the adjacent ends of the bars 22 and the half length braces 33.

These looped portions of the cable 35 are thus carried downwardly over the opposite sides of the pulleys 37 and through and beneath a double pulley 39 mounted upon a stud 40 projecting from the side of the lower post section at a point near the bottom of the post, and the looped cable 35 is thence carried upwardly with its closed end about a single pulley 41 connected to the lower end of an adjacent spring 42. The spring 42 is carried upwardly along the inner side of the adjacent post and is anchored at its upper end upon a pin 43 secured to the upper movable post sections 17, near the upper end of the latter. The springs 42 thus maintain a constant tension upon the cable 35, and when the truck is more or less collapsed and the upper port sections 17 are raised or extended, the spring 42 is carried therewith so as to maintain to a more or less extent the tension required on the cable 35. The cable 35 is thus maintained taut along the upper sides and ends of the truck and affords a suitable flexible means upon which the upper edge portion of the drape may be suspended.

The drape 34 is provided at suitable points throughout its length and at its inner side with clips 44, shown to advantage in Figures 1, 2 and 3. Each clip 44 may comprise a plate of metal or the like having openings 45 therein through which thread may pass for stretching or otherwise securing the clips to the inner side of the drape 34.

The upper end of the plate of each clip is preferably reduced in width and overturned to provide a hook 46 adapted to engage over the cable 35 to afford a means of suspension of the drape from the cable.

It will be readily understood that these clips may be quickly and easily released from the cable 35 when it is desired to interchange or remove the drapes, and that when the drape is once applied to the truck it may remain in position during the extension, collapsing and adjustment of the truck so that the whole may be used as a unit and it is unnecessary to remove or replace the drape upon each setting up or knocking down of the truck.

In operation when the truck is set up and the drape 34 applied thereto, the springs 42, one carried by each corner post or leg, maintain a sufficient tension upon the downwardly looped portions of the cable or flexible element 35 as to hold the cable taut under the weight of the drape 34. When the truck is collapsed or reduced in size, by drawing upwardly on the handle 30 as above explained, the truck contracts in length and width but the slack occasioned in the cable 35 is taken up not only by the tension of the springs 42, but also by the raising of the upper post sections 17 which raise the anchoring ends of the springs 42.

It will be noted that as thus described, the truck and drape are susceptible of being simultaneously folded or collapsed whereby when not in use they may be conveniently stored in a comparatively small space while being ready for instant use should occasion demand, thus conserving investments in such equipment.

In operation a funeral director precedes a casket to a church, home or the like where funeral services are to be conducted, usually in a conventional automobile, and it will be noted that the new device may be readily folded for transportation in the automobile and adapted for ready extension for receiving a casket at a curbstone or the like prior to moving the casket and truck to the place of ceremony; after which the casket is transported on the truck to the hearse. The new device is collapsed for transportation and arrival at a cemetery prior to the arrival of the casket where the truck may be again used and during said time the draping will remain folded in an ornate appearing manner, the number of folds being dependent on the number of hooks 52 employed; the drape 51 may be quickly and readily removed and one of a different color or size substituted therefor in accordance with the age of the deceased and custom.

From the foregoing description it is thought to be obvious that a funeral casket drape constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

What is claimed is:—

1. A casket truck comprising corner posts, extensible and collapsible side and end connecting means for the posts, a drape carrying cable, extensible and collapsible end supports carried by the posts and supporting the cable, and tension means carried by the posts, said cable being looped over the tension means at each post for maintaining the cable taut until adjustment of the truck.

2. A casket truck comprising a flexible and extensible frame having corner posts, adjustable brackets mounted upon the opposite ends of said frame for adjustment therewith, a cable threaded through said brackets and supported thereby about the upper edge of the frame, pulleys mounted on the upper ends of the posts for receiving said cable thereover, said cable being looped downwardly from the pulleys on the posts, lower pulleys mounted on the post for receiving the looped portions of the cable, a tension device mounted on each post and connected to the closed ends of the looped portions of the cables for maintaining the cable taut at all adjustments of the frame, drape and the brackets.

3. A casket truck comprising vertically extensible corner posts, a flexible frame mounted on the posts, flexible brackets mounted on the opposite ends of the frame, a pair of pulleys mounted on the upper extensible end of each post, a cable carried by said brackets and being looped downwardly in opposite directions over the pulleys on the upper ends of the posts, a lower set of pulleys on the lower fixed ends of the posts for receiving the looped portions of the cable thereon, a pulley mounted in the closed loops of the cable, and springs between the single pulleys and the upper extensible ends of the posts for maintaining the looped portions of the cable under tension until adjustment of the frame.

4. A casket truck comprising corner posts, extensible sections mounted in the upper ends of the posts, lazy tong side portions connecting the posts and connected respectively to the upper and lower portions of the posts, brackets extending outwardly from the lazy tong side portions of the frame, a cable mounted in said brackets and extending around the frame, said cable being looped downwardly along said posts, and a tension device mounted on each post and connected to the downwardly looped portion of the cable for maintaining the latter taut at all times.

5. In a casket truck, the combination of an extensible and contractible frame, a cable mounted about the upper edge of the frame, and tension means between the cable and the frame for maintaining the cable taut at all adjustments of the frame.

DERRELL E. BROWN.